Sept. 20, 1966　　　J. L. CHANEY　　　3,273,394
DEPTH THERMOMETER
Filed Aug. 23, 1963
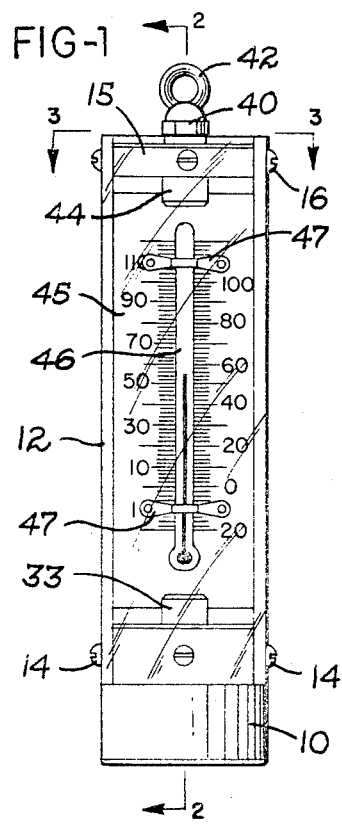
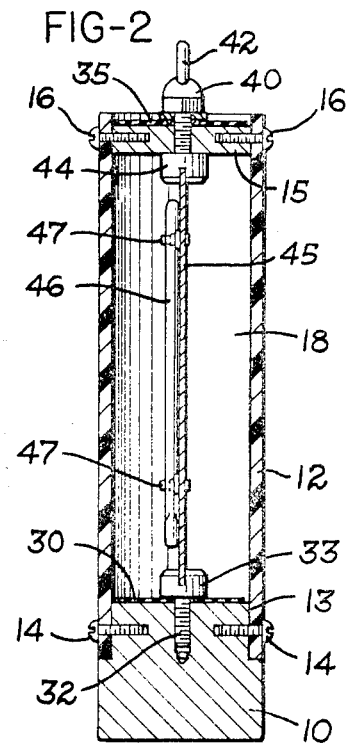
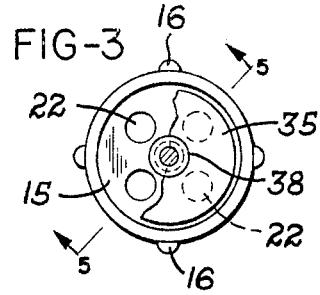
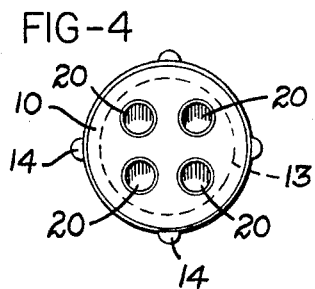
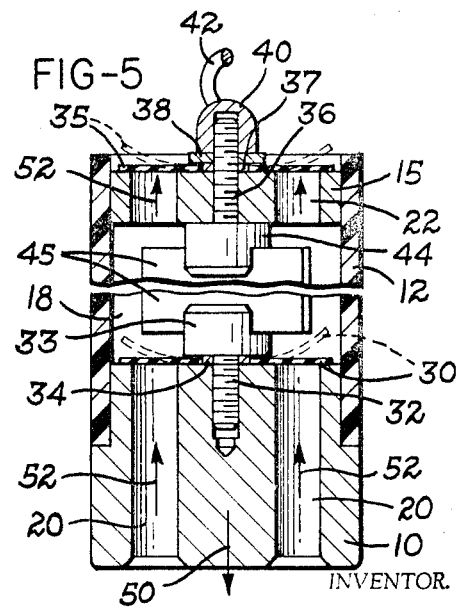
INVENTOR.
JOHN L. CHANEY
BY Marechal, Biebel, French & Bugg
ATTORNEYS

United States Patent Office 3,273,394
Patented Sept. 20, 1966

3,273,394
DEPTH THERMOMETER
John L. Chaney, Lake Geneva, Wis.
Filed Aug. 23, 1963, Ser. No. 304,046
4 Claims. (Cl. 73—354)

This invention relates to thermometers and more particularly to a thermometer capable of measuring the temperature at some distance below the surface of a body of liquid.

It is an object of this invention to provide a simple, inexpensive and reliable depth thermometer for sampling and measuring the temperature at a desired depth below the surface of a body of liquid, such as the ocean, a lake or stream, or in a tank where liquid foods, chemicals or the like are being treated. A thermometer of this type is particularly useful in testing the temperature of fishing lakes of some depth where there may be an inflow of relatively cold water from springs or the like which may form as a cold body in the bottom of the lake with a substantial difference of temperature existing above that area. It is sometimes found that a marked temperature gradient occurs within a relatively short vertical distance, and the ability to determine accurately where such gradient exists and the temperatures at various elevations above the bottom can be of considerable advantage to skilled fishermen. Through the use of the depth thermometer of this invention it is relatively simple to obtain samples at any desired depth, bring such samples to the surface where the temperature can be read and recorded or charted, and to again lower a thermometer to a different depth for sampling and testing over as great a range of vertical depth as may be desired. As will be obvious, however, the invention is equally advantageous when applied to sampling and submerged temperature determinations for other purposes.

Other objects and advantages will be apparent from the following description, the accompanying drawings and the appended claims.

In the drawings which illustrate a preferred embodiment of the invention

FIG. 1 is a view in elevation of a thermometer constructed in accordance with and embodying the novel features of the present invention;

FIG. 2 is a vertical sectional view on the line 2—2 of FIG. 1;

FIG. 3 is a top view looking down on the upper flapper valve and with part of the valve being broken away substantially on the line 3—3 of FIG. 1;

FIG. 4 is a bottom view looking upwardly toward the bottom of the thermometer; and FIG. 5 is an enlarged vertical sectional view with the intermediate parts broken away, the section being taken through the port passages.

Referring now to the drawings which illustrate a preferred embodiment of the invention, the device comprises a base member 10 preferably solid and of substantial weight so that the thermometer will be caused to drop rapidly through the body of liquid and maintained in a vertical position. In order to avoid corrosion and the like it is preferably made of a material such as stainless steel, and the same or equivalent materials are used for the other metal parts of the device.

A transparent tubular member 12 of Lucite or similar transparent plastic is mounted on the base in a groove or reduced diameter portion 13 at the upper end of the latter and received in tight fitting relation thereon to form a sight glass. A plurality of screws 14 secure the overlapping end of the tubular member to the base and establish a connection which is substantially liquid-tight although ordinarily there is no necessity for an absolute seal.

The tube 12 is of a size capable of receiving a thermometer which can be easily read and as an example it may have an internal diameter of approximately 1¾ inches and an overall length of six to seven inches. The cylindrical curvature of the tubular member also has the advantage of acting as a magnifying lens and increasing the apparent size of the scale on the thermometer.

A head or closure member 15 is located at the upper end of the tube 12, such member likewise being preferably of stainless steel or other corrosion resisting material and having an outside diameter only slightly less than the inside diameter of tube 12 so that a tight fit is formed when it is in position. Screws 16 secure the head in place at the upper end of the tube thus defining a chamber 18 of generally cylindrical construction and sufficiently elongated to receive the thermometer and the sample of liquid the temperature of which is to be tested.

In order to provide for inward flow of the liquid as the thermometer is lowered through the same, a series of bores or passages 20, shown as four in number, and of sufficient diameter to allow for rapid flow therethrough, for example ⅜ inch, are provided extending axially of base 10 from one end thereof to the other at an intermediate radial distance from the axis. A similar series of bores 22 is provided and similarly located with respect to the axis of the head 15. It will be understood that the pattern of these bores may be varied as desired and that there is no particular need for correlation in the arrangement of the bores at one end with those in the other. Their purpose is to form port means for the free entry and out-flow of the liquid into and from the interior of the sampling chamber 18.

A unidirectional valve is provided in the form of an impervious diaphragm 30 overlying the upper ends of the ports 20 and seating upon the upper face of base 10. A material for this diaphragm is a low Shore natural or synthetic elastomer, preferably chemically stable in salt water. A specific example of material suitable for this purpose is neoprene with a thickness of about ⅓₂ inch. A centrally located stud 32 having an enlarged head 33 is fastened into base 10 but is spaced above the top of the base by means of a washer 34 of a thickness slightly greater than that of the diaphragm 30. Further the diaphragm has an outside diameter which is less than the internal diameter of the tube 12. As a result, the diaphragm is free to rotate and move to a limited extent in all directions as well as to flex into the dotted line position shown, which facilitates its valving action.

A similar diaphragm 35 is located on the upper face of the head 15 and kept in place by means of a central stud 36 over which there is received washer 37 and collar 38. The washer 37 is slightly greater in thickness or axial extent than the diaphragm 35 and the diaphragm is thus free to rotate or adjust itself about the washer in use. The assembly is maintained by means of acorn nut 40 received over stud 36 and pressing the collar 38 against washer 37 so that both diaphragms are in secure position but without squeezing or impairing the freedom of movement thereof.

A suitable ring 42 is fastened to the top of the acorn nut and a graduated line, not shown, may be tied to the thermometer so that the entire device can be lowered and raised into the body of liquid.

Stud 36 has an enlarged head 44 at its inner end and both this head and the lower head 33 have cross slots therein which are adapted to receive the metal plate 45 forming part of the thermometer. The tube is shown at 46, being fastened to the plate by suitable brackets 47 in the customary manner so that the thermometer stands substantially centrally with its reading plate extending throughout the major portion of the length of chamber 18 and thus directly subject to the temperature of the liquid trapped therein.

The operation of the depth thermometer of this invention will now be clear from the above description. It is necessary only to lower the device into the liquid the temperature of which is to be determined. As the device drops through the liquid in the direction of the downward arrow 50 in FIG. 5, there will be an up-flow of liquid in the direction of the arrows 52 also shown in that figure. This will first fill the chamber 18, the air being forced out past diaphragm 35 at the upper end of the chamber, and thereafter successive changes of liquid will occur as the thermometer is lowered further into the body of water. It should be noted that the combined area of the port means 20 and 22 respectively is sufficiently large so that this flow will occur rapidly as the device is lowered and without any substantial delay in the passage of water through the chamber which might result in an incorrect temperature reading.

As soon as the device has reached the depth at which the sample is to be taken, which may be determined by observing the graduations previously measured on the handling line, it is lifted up and the first upward movement causes the closing of port valves 30 and 35 with resultant trapping of the sample within chamber 18. Because of the fairly large volume of such sample, there is adequate time to lift the device from whatever depth the sample has been taken and to raise it out of the liquid for purposes of reading before there has been any substantial change of temperature as a result of being drawn through the surrounding body of liquid. The use of Lucite for this purpose and particularly a tube having an appreciable wall thickness such for example as an eighth of an inch, affords an effective heat insulating shield so that the temperature when read above the surface of the liquid is reasonably accurate and a good measure of the temperature below.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed:

1. A depth thermometer for measuring the temperature of a body of liquid at a distance below the surface thereof comprising:
   a weighted base member,
   a transparent tubular member mounted on said base and forming a chamber for receiving and retaining a quantity of liquid,
   said base member having port means extending therethrough and communicating with the lower part of said chamber,
   a closure member mounted at the upper end of said chamber and fastened to said tubular member in liquid sealing relation therewith,
   said upper closure member also having port means therethrough communicating with the upper part of said chamber,
   studs mounted on said base and upper closure members respectively and having slotted heads extending into said chamber,
   and a thermometer mounted in the slots of said studs in position centrally of and readable through said tubular member.

2. A depth thermometer for sampling and measuring the temperature of a body of liquid at a distance below the surface thereof comprising:
   a weighted cylindrical base member having a flat upper surface;
   a hollow transparent cylindrical sight glass mounted on said base member and extending upwardly therefrom;
   a closure member having a flat upper surface and mounted on the upper portion of said sight glass and cooperating with said base member and said sight glass to define a chamber for retaining a quantity of liquid;
   means defining a plurality of vertically extending ports in both said base and said closure members;
   a thermometer spaced entirely within said chamber and having a scale readable through said sight glass;
   means connected to said base member and said closure member for supporting both ends of said thermometer within said chamber; and
   a thin flexible diaphragm mounted on said upper surface of each said base and closure members and overlying said ports therein and arranged to flex to allow an upward flow of liquid into and through said chamber as the thermometer is lowered into the liquid and to seat in positive closing relation with said ports for trapping liquid in said chamber as the thermometer is raised through and out of the body of liquid.

3. A depth thermometer as defined in claim 2 wherein said means for supporting said thermometer includes a plate member, and screw means for retaining said plate member and for securing said diaphragms to said corresponding base and closure member to provide a simplified assembly for said depth thermometer.

4. A depth thermometer as defined in claim 2 including means defining a groove on the outer periphery of said base member for receiving the lower end portion of said sight glass in interfitting relationship, means mounting said closure member within the upper portion of said sight glass in interfitting relationship, and said base member having an outer cylindrical surface corresponding in diameter generally with the outer surface of said cylindrical sight glass for providing said depth thermometer with a generally smooth uniform circular outer configuration.

References Cited by the Examiner

UNITED STATES PATENTS

| | | | |
|---|---|---|---|
| 1,739,669 | 12/1929 | Greenwald | 73—374 |
| 1,780,597 | 11/1930 | Mayhall et al. | 73—354 |
| 2,271,254 | 1/1942 | De Witt | 73—354 |
| 2,345,220 | 3/1944 | Sarchet | 222—207 X |
| 2,609,689 | 9/1952 | Harris | 73—354 X |
| 2,804,240 | 8/1957 | Anderson | 222—207 |

LOUIS R. PRINCE, *Primary Examiner.*

D. M. YASICH, *Assistant Examiner.*